May 6, 1941.  W. E. PHILLIPS  2,240,855
TIRE CONSTRUCTION
Filed Dec. 15, 1939
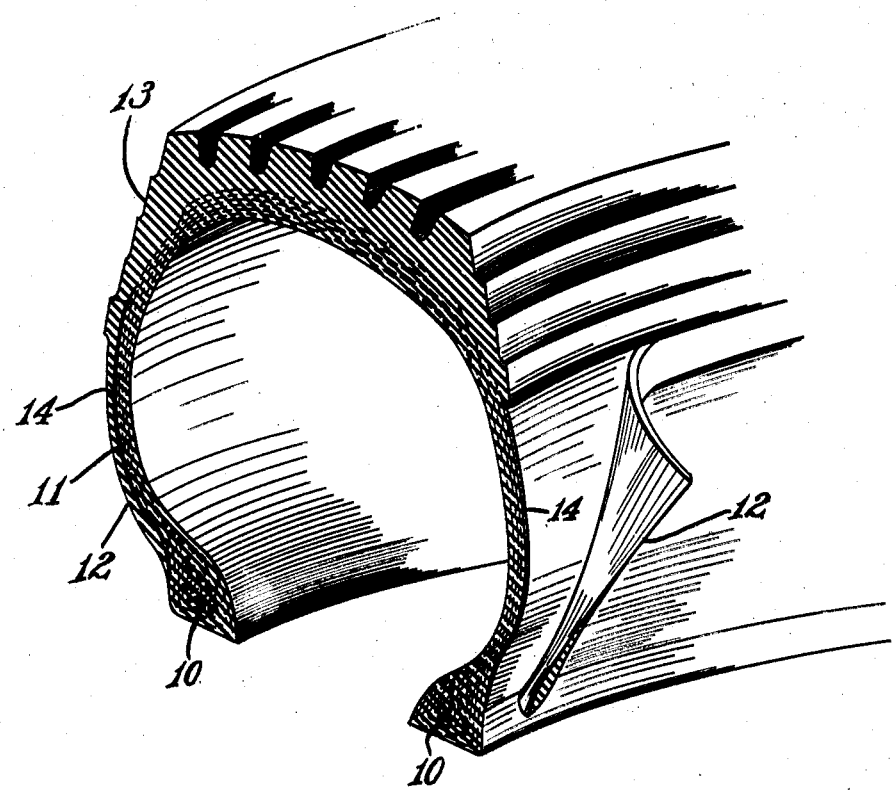
Inventor
Warren E. Phillips
By Willis F. Avery
Att'y Patented May 6, 1941

2,240,855

UNITED STATES PATENT OFFICE 2,240,855

TIRE CONSTRUCTION

Warren E. Phillips, Cuyahoga Falls, Ohio, assignor to The B. F. Goodrich Company, New York, N. Y., a corporation of New York Application December 15, 1939, Serial No. 309,369

7 Claims. (Cl. 152—330)

This invention relates to tire constructions and particularly to so-called white sidewall tires and other articles including a white or other light-colored rubber portion in close proximity to other rubber portions which normally or desirably contain materials which would stain, discolor or otherwise deleteriously affect the light-colored portion. The invention is particularly concerned with the provision of an improved construction for white sidewall tires designed to permit use in such tires of materials heretofore prohibited and to eliminate the staining and discoloration of the white sidewalls which has occurred frequently in prior products when some of the prohibited materials were employed either accidentally or intentionally.

Considerable trouble has been encountered in producing an entirely satisfactory white sidewall tire because white or other light-colored rubber compositions are subject to staining by a variety of migratory staining materials frequently and desirably employed in rubber compositions embodied in tire constructions. Such staining is especially serious when the tire is exposed to sunlight for long periods as in the course of regular service on an automobile. For example, white rubber compositions are stained by almost all the common age-resisters now available commercially for use in rubber. Many of the common accelerators of vulcanization, softeners, oils, and other common rubber compounding materials likewise will stain white rubber. Materials contained by much of the ordinary reclaimed rubber and especially that made from old tires, which is the main source of scrap rubber, will also stain white rubber. The problem here is particularly complicated from the standpoint of controlling such staining because, in addition to staining oils frequently added during the reclaiming process, the reclaimed rubber may contain a variety of more or less indeterminate staining materials carried over into the reclaimed rubber from the scrap rubber used in producing the reclaim. The precise composition of the scrap rubber and of the reclaimed rubber made from it ordinarily is neither a known nor a constant factor but one which cannot be known precisely nor maintained without variance. Furthermore, all such staining materials are soluble in rubber and will migrate from one rubber layer to another rubber layer contiguous to the first layer.

It has accordingly not been feasible to use any such materials either in the whitel rubber composition itself or in any rubber composition disposed closely adjacent to the white rubber in an ordinary rubber product such as a tire casing. This requirement has introduced serious problems especially in connection with the carcass portion of the tire which underlies the sidewall portion. In order to obtain processing characteristics favorable to thorough rubberizing of cord fabric to be used in the carcass, it is desirable in many instances to utilize in the rubber composition calendered on the cords a substantial proportion of reclaimed rubber prepared from old tires. Additionally, such use of reclaimed rubber in the carcass reduces the cost of the tire without lowering its quality. This has not been possible in white sidewall tires without resultant staining of the sidewall. Similarly, it has not been possible to use in the carcass common age-resisters, softeners and the like, and the choice of accelerators of vulcanization has been serious limited by these considerations. Even when efforts are made to eliminate all such migratory staining materials from the carcass, still staining of the white sidewall sometimes results from some unknown or unexpected staining material accidentally or intentionally included in some of the adjacent rubber compositions.

The present invention aims to eliminate all these prior difficulties and to permit free use of migratory staining materials in rubber compositions disposed closely adjacent to white or other light-colored rubber compositions in any ordinary rubber product and especially in white sidewall tires. This is accomplished by interposing between the light-colored rubber composition and the rubber composition containing migratory staining materials a buffer layer containing an inhibitor of migration so that migration of the staining material into the light-colored rubber composition is retarded or completely prevented. The invention accordingly eliminates entirely the serious staining difficulties hereinabove described and, additionally, makes possible the use of many materials heretofore prohibited in composite constructions such as white sidewall tires, with attendant substantial economies and definite improvement in the quality of the product.

A tire construction embodying the invention is illustrated in the accompanying drawing in which the single figure is a fragmentary sectional perspective view showing a portion of a tire embodying the invention, the sidewall portion being stripped back for clarity of illustration.

As illustrated, a tire construction embodying the present invention includes the usual bead portions 10, 10, carcass portion 11 comprising a plurality of plies of rubberized cord fabric, sidewall portions 12, 12, and a tread portion 13 which extends down over the shoulders of the tire to join the sidewall portions. As will be described more fully hereinafter, the sidewall portions 12, 12 are formed of a white rubber composition subject to staining and the carcass portion 11 comprises a rubber composition containing a migratory material which normally would migrate into and stain the white sidewall. Such migration and staining is prevented, however, by interposing buffer layers 14, 14 between the sidewall portions 12, 12 and the respective underlying zones of the carcass portion 11, the buffer layers 14, 14 being formed of a rubber composition containing a sufficient quantity of an inhibitor of migration to check the migration effectively or to block it completely. Ordinarily, the buffer layer should contain from 10 to 30 per cent by volume of migration inhibitor, the percentage being based on the total rubber content of the composition from which the buffer layer is formed. Smaller or larger proportions of migration inhibitor may be used with some degree of satisfaction but quantities less than about 10 per cent by volume usually permit too much migration for practical success and quantities greater than about 30 per cent by volume are likely to make the buffer layer undesirably stiff. The composition of the rubber in the tread and bead portions is immaterial insofar as the present invention is concerned since the area of contact between these portions and the white sidewall is so slight that, as a practical matter, no problem of migration and staining is introduced. The tire, of course, is built up from its constituent parts and vulcanized in the usual manner to produce the finished tire in which the several parts are integrally united by conjoint vulcanization to provide a unitary structure.

Exemplary recipes for rubber compositions satisfactory for use in the sidewall and carcass portions of the tire and in the buffer layer interposed between them are set out hereinbelow without intent to limit the invention thereto, it being understood that the materials specified may be substituted and/or supplemented by numerous other materials and that all such materials may be used in widely varying proportions, all according to usual rubber compounding practice.

White sidewall rubber composition

| | Parts by weight |
|---|---|
| New crude rubber | 100.0 |
| Softening agent ("Reogen") | 0.5 |
| Stearic acid | 2.0 |
| Paraffin | 0.75 |
| Zinc oxide | 50.0 |
| Titanium dioxide | 20.0 |
| Precipitated calcium carbonate | 30.0 |
| Ultramarine blue | 0.15 |
| Sulfur | 3.0 |
| Accelerator (mercapto benzothiazole) | 1.0 |
| Accelerator (zinc dimethyl dithio carbamate) | 0.05 |

Carcass rubber composition

| | Parts by weight |
|---|---|
| New crude rubber | 60.0 |
| Reclaimed rubber (whole tires) | 80.0 |
| Zinc oxide | 3.0 |
| Stearic acid | 3.0 |
| Light mineral oil | 1.5 |
| Pine tar | 2.5 |
| Mineral rubber | 4.5 |
| Age-resister ("Neozone D") | 0.5 |
| Accelerator ("Zenite B") | 0.5 |
| Sulfur | 4.0 |

Buffer layer rubber composition

| | Parts by weight |
|---|---|
| New crude rubber | 100.0 |
| Zinc oxide | 5.0 |
| Stearic acid | 1.0 |
| Sulfur | 3.0 |
| Accelerator (mercaptobenzo thiazole) | 1.0 |
| Migration inhibitor | 30.0 |

The white sidewall rubber composition hereinabove set out will be stained and discolored, especially after prolonged exposure to sunlight, by a variety of materials including several of the specific materials of the carcass rubber composition given above. Of the carcass composition, whole tire reclaimed rubber contains migrating staining materials of varying and somewhat indeterminate character. Likewise, pine tar, mineral rubber and the age-resister "Neozone D" will stain the white sidewall.

A wide variety of migration inhibitors have been tested and may be used in the buffer layer with varying degrees of success. It has been found, however, that activated charcoal, or activated carbon as it is sometimes called, produces outstanding results and this material has been adopted for commercial use in the buffer layers of white sidewall tires embodying the present invention. An excellent activated charcoal for this purpose may be obtained commercially from the Industrial Chemical Sales Company under the trade name "Nuchar OOO." The incorporation of 30 parts by weight of activated charcoal having a specific gravity of 1.27 per 100 parts of rubber, in accordance with the recipe given above for the buffer layer rubber composition, will produce a composition containing about 22% by volume of activated charcoal based on the rubber content of the composition. The activated charcoal is, of course, added to the rubber in a very finely-divided condition. A buffer layer about 0.025" thick formed of such a composition will effectively prevent staining of the white sidewall. Care should be exercised to include sufficient accelerator of vulcanization in the rubber to vulcanize it properly in the presence of the large quantity of highly adsorptive charcoal.

A variety of other known migration inhibitors may be employed in the buffer layer with some reduction in staining of the white sidewall but the reduction in staining obtained with buffer layers containing such other inhibitors is in no wise comparable to that obtained when activated charcoal is employed. Migration inhibitors such as colloidal clays, fuller's earth, channel black, carbon black, bone black, ordinary charcoal, acetylene black, animal charcoal, activated silica gel, activated alumina, and the like, as well as resinous materials such as ordinary animal glue, fish glue, rosin, shellac, cumar resin, p-coumarone-indene resin, ester gum, vinyl resins, acrylic resins, alkyd resins, glyptal resins, phenol-formaldehyde resins, the various types of thermoprenes and the like, all are effective to a greater or lesser degree in preventing migration and staining, but all these materials are definitely inferior to activated charcoal in this respect. It was first thought that the highly adsorptive character of activated charcoal was responsible for its unusual efficiency in preventing migration and staining but, as indicated above, other active adsorbing agents such as activated silica gel and activated alumina are much less effective in the buffer layer.

In order that the migration inhibitor may function most effectively, the rubber composition of the buffer layer itself preferably should be free of migratory staining materials when the tire or other article is built. Small quantities of such materials are not absolutely prohibited in the buffer layer, however, and considerable proportions of such materials may be present without destroying the effectiveness of the buffer layer when the better migration inhibitors are used and, especially, when activated charcoal is used in the buffer layer.

Numerous modifications and variations in details of the structures, materials, and proportions of materials as hereinabove described may be effected without departing from the spirit and scope of the invention as defined by the appended claims.

I claim:

1. An article of manufacture including a portion comprising a light-colored rubber composition normally subject to staining, a second portion disposed closely adjacent to the first portion and comprising a rubber composition containing a migratory material which normally would stain the light-colored composition, and a buffer layer interposed between the first two portions, the buffer layer comprising a rubber composition substantially free of staining materials and containing activated charcoal, the first and second portions being integrally united respectively with opposed faces of the buffer layer to provide a unitary structure in which the light-colored first portion is not subject to staining by the migratory staining material of the second portion.

2. An article of manufacture including a portion comprising a light-colored rubber composition normally subject to staining, a second portion disposed closely adjacent to the first portion and comprising a rubber composition containing a migratory material which normally would stain the light-colored composition, and a buffer layer interposed between the first two portions, the buffer layer comprising a rubber composition containing activated charcoal, the first and second portions being integrally united respectively with opposed faces of the buffer layer to provide a unitary structure in which the light-colored first portion is not subject to staining by the migratory staining material of the second portion.

3. An article of manufacture including a portion comprising a light-colored rubber composition normally subject to staining, a second portion disposed closely adjacent to the first portion and comprising a rubber composition containing a migratory material which normally would stain the light-colored composition, and a buffer layer interposed between the first two portions, the buffer layer comprising a rubber composition containing from 10 to 30 per cent by volume, based on the rubber, of activated charcoal, the first and second portions being integrally united respectively with opposed faces of the buffer layer to provide a unitary structure in which the light-colored first portion is not subject to staining by the migratory staining material of the second portion.

4. A tire casing comprising a light-colored sidewall portion normally subject to staining, a carcass portion comprising a rubber composition containing a migratory material which normally would stain the light-colored sidewall portion, and a buffer layer interposed between the light-colored sidewall portion and the carcass portion, said buffer layer comprising a rubber composition substantially free of staining materials and containing activated charcoal, whereby the light colored sidewall portion is not subject to staining by the migratory staining material of the carcass portion.

5. A tire casing comprising a light-colored sidewall portion normally subject to staining, a carcass portion comprising a rubber composition containing a migratory material which normally would stain the light-colored sidewall portion, and a buffer layer interposed between the light-colored sidewall portion and the carcass portion, said buffer layer comprising a rubber composition containing activated charcoal, whereby the light-colored sidewall portion is not subject to staining by the migratory staining material of the carcass portion.

6. A tire casing comprising a light-colored sidewall portion normally subject to staining, a carcass portion comprising a rubber composition containing a migratory material which normally would stain the light-colored sidewall portion, and a buffer layer interposed between the light-colored sidewall portion and the carcass portion, said buffer layer comprising a rubber composition containing from 10 to 30 per cent by volume, based on the rubber, of activated charcoal, whereby the light-colored sidewall portion is not subject to staining by the migratory staining material of the carcass portion.

7. A tire casing comprising a light-colored sidewall portion normally subject to staining, a carcass portion comprising a rubber composition containing a migratory material which normally would stain the light-colored sidewall portion, and a buffer layer interposed between the light-colored sidewall portion and the carcass portion, said buffer layer comprising a rubber composition substantially free of staining materials and containing from 10 to 30 per cent by volume, based on the rubber, of activated charcoal, whereby the light-colored sidewall portion is not subject to staining by the migratory staining material of the carcass portion.

WARREN E. PHILLIPS.